(12) United States Patent
Friedrich et al.

(10) Patent No.: US 9,906,104 B2
(45) Date of Patent: Feb. 27, 2018

(54) METHOD FOR BALANCING A COMPONENT

(71) Applicant: Siemens Aktiengesellschaft, München (DE)

(72) Inventors: Jens Friedrich, Bad Neustadt (DE); Martin Kuhn, Oerlenbach (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 309 days.

(21) Appl. No.: 14/649,829

(22) PCT Filed: Nov. 27, 2013

(86) PCT No.: PCT/EP2013/074828
§ 371 (c)(1),
(2) Date: Jun. 4, 2015

(87) PCT Pub. No.: WO2014/086631
PCT Pub. Date: Jun. 12, 2014

(65) Prior Publication Data
US 2015/0311774 A1   Oct. 29, 2015

(30) Foreign Application Priority Data
Dec. 5, 2012   (EP) .................................... 12195649

(51) Int. Cl.
| H02K 7/04 | (2006.01) |
|---|---|
| H02K 15/16 | (2006.01) |
| F16F 15/32 | (2006.01) |

(52) U.S. Cl.
CPC ........... H02K 15/165 (2013.01); F16F 15/32 (2013.01); H02K 7/04 (2013.01)

(58) Field of Classification Search
CPC .......... H02K 7/04; H02K 15/165; F16F 15/32
(Continued)

(56) References Cited

U.S. PATENT DOCUMENTS 1,752,104 A * 3/1930 Myers .................... H02K 17/30
                                                                      310/212
6,597,719 B1   7/2003 Nara
(Continued)

FOREIGN PATENT DOCUMENTS

| CN | 1309829 A | 8/2001 |
|---|---|---|
| CN | 101110541 A | 1/2008 |

(Continued)

OTHER PUBLICATIONS

Levit M. E., Rischenkov W. M.: "Balandcing of Parts and Units", Maschinostcoenie, 1986, 248s., Redaktionsschluss am Jun. 11, 1986.

Primary Examiner — John K Kim
(74) Attorney, Agent, or Firm — Henry M. Feiereisen LLC

(57) ABSTRACT

The invention relates to a method for balancing a component (1), in particular a rotor of an electric machine, using pins (11, 11') which are introduced into prefabricated openings (5, 7, 9) in the component (1). The component (1) is balanced in that pins (11, 11') of different lengths, cross-sectional areas, and cross-sectional shapes are fixed in corresponding openings (7, 9) in the component (1). Furthermore, the pins (11, 11') can be assembled from multiple elements (13, 13'), and the method can be used to increase the balancing quality incrementally in one or more stages. The imbalance of the component (1) can be considerably reduced using said method, and simultaneously the weight, space requirements, and inertia of the component (1) can be reduced. In addition, the method can be automated.

16 Claims, 3 Drawing Sheets

(58) Field of Classification Search
USPC .................................. 310/261.1; 29/598, 732
IPC ................................................ H02K 7/04,15/16
See application file for complete search history.

(56) References Cited

U.S. PATENT DOCUMENTS

| | | | |
|---|---|---|---|
| 2010/0117471 A1 | 5/2010 | Huang | |
| 2011/0074242 A1* | 3/2011 | Singhal | H02K 1/22 |
| | | | 310/216.058 |
| 2013/0257189 A1* | 10/2013 | Blum | G01M 1/36 |
| | | | 310/51 |
| 2015/0311774 A1* | 10/2015 | Friedrich | F16F 15/32 |
| | | | 310/261.1 |

FOREIGN PATENT DOCUMENTS

| | | |
|---|---|---|
| DE | 103 52 775 A1 | 6/2004 |
| DE | 2009 047 619 A1 | 6/2011 |
| EP | 0 622 885 A2 | 11/1994 |
| RU | 83370 U1 | 5/2009 |
| RU | 119541 U1 | 8/2012 |
| TW | M354274 U | 4/2009 |
| WO | WO 2014/060339 A2 | 4/2014 |

* cited by examiner

METHOD FOR BALANCING A COMPONENT

CROSS-REFERENCES TO RELATED APPLICATIONS

This application is the U.S. National Stage of International Application No. PCT/EP2013/074828, filed Nov. 27, 2013, which designated the United States and has been published as International Publication No. WO 2014/086631and which claims the priority of European Patent Application, Serial No. 1219569.4, filed Dec. 5, 2012, pursuant to 35 U.S.C. 119(a)-(d).

BACKGROUND OF THE INVENTION

The invention relates to a method for balancing a component, in particular a rotor of an electric machine. The invention further relates to a component of an electric machine which is balanced by using such a method, and to an electric machine which has such a component. The invention also relates to a device by means of which a component is balanced using the method according to the invention.

Components which rotate while they are operating do as a general rule need to be balanced. During a balancing operation a balancing of masses takes place, axially and radially with respect to the axis of rotation, such that the axis of rotation of the component matches one of the principal axes of inertia of the component. If the axis of rotation and one of the principal axes of inertia do not match, moments of deviation occur when the component is rotating which in particular place a stress on the mounting of the rotating component. This behavior is often referred to as the effect of an imbalance in the component. Moments of deviation cause a periodically recurring moment of force orthogonal to the axis of rotation of the component. These moments of force can result in a considerable stress on the mounting of the component in the case of high rotational energies. Said stress may result in destruction of the entire electric machine. Components which are intended for rotating use are therefore balanced.

In order to compensate for moments of deviation, rotating components are either balanced by the fitting of defined weights at certain positions or cylindrically shaped pins are inserted into prefabricated holes. Said cylindrically shaped pins permit only an approximate balancing. A more precise balancing is possible for example when using balancing cement where the balancing cement is applied to the corresponding points of the component to be balanced. Balancing cement can be easily portioned very accurately and can be applied to almost any position of the component. A high quality of balancing can therefore be achieved by means of balancing cement. This method is however more demanding on the person who performs the balancing. Moreover, the same quality of balancing is not always achieved.

SUMMARY OF THE INVENTION

The object of the invention is to improve the balancing of components.

This object is achieved with regard to a method of the type described in the introduction in that the component is balanced by pins having cross-sectional areas of different sizes being fixed into corresponding openings in the component.

According to another aspect of the invention, the object is achieved by a component of an electric machine having pins for balancing the component, wherein corresponding openings having different sizes of their cross-sectional areas are provided for the pins, wherein the pins are fixed in the corresponding openings, and wherein the component is balanced by a method as set forth above.

According to still another aspect of the invention, the object is achieved by an electric machine having such a component.

This object is further achieved by a device for balancing a component, in particular a rotor of an electric machine. In this situation, after an imbalance is determined the device fixes pins having different sizes of cross-sectional area in the openings provided for the purpose. If the quality of the balancing is inadequate, this process is repeated.

The invention is based on the experience that when prefabricated pins having a cross-sectional area of a fixed size are used this may result in an inadequate quality of the balancing. A high quality is of great importance in particular for electric motors in electrically powered automobiles. Through the combination of pins having a large cross-sectional area and pins having a small cross-sectional area which are fixed side by side in openings provided for the purpose it is possible to increase the quality of the balancing. The cross-sectional area is understood as being the area which is located parallel to the surface of the component after the pins have been fixed. The edge of the cross-sectional area can have both rounded and also angular regions. Cylindrically shaped pins have however proved to be particularly advantageous. A friction-locked connection resulting from a press-in operation, a connection by adhesive means and a screw connection can be used for fixing the pins. A screw connection is to be chosen in particular in the case of cylindrically shaped pins and can be combined with an adhesive connection. The use of an adhesive connection for fixing the pins in the corresponding opening has proved to be best suited for this method. In addition to the high quality of balancing which can be achieved, an advantage of this method consists in the capability to automate the method. If the quality of the balancing proves to be inadequate after the method has been performed once, the operation can be repeated and additional pins having a small cross-sectional area can be fixed into the openings remaining free. This is referred to in the following as a multistage method. It is also possible to automate the multistage method. The high quality of balancing which can be achieved results in a considerably extended service life with lower production costs in comparison with a manual balancing process.

In an advantageous embodiment of this method the openings are arranged in such a manner that at least one further opening having a second cross-sectional area is in each case arranged in the immediate vicinity of the openings having a first cross-sectional area, where the first cross-sectional area is smaller in size than the first cross-sectional area. As a result of said combination of openings which are provided for the corresponding pins, a high quality of balancing can be achieved with a low space requirement. Balancing by means of pins having a small cross-sectional area is more precise than using pins having a large cross-sectional area because the accuracy of the penetration depth is limited after the pins have been fixed. The localization of the openings having large and small cross-sectional areas results in an increased stability of the component in comparison with a more homogeneous distribution of the openings over the surface of the component.

In a further advantageous form of embodiment three further circular openings having a second cross-sectional area are arranged in each case in such a manner around the circular opening having the first cross-sectional area that the edges of the further openings are situated in the immediate vicinity of the edge of that opening which has the first cross-sectional area. The connecting lines between the center of the circular opening having the large cross-sectional area and the centers of the further circular openings advantageously enclose an angle of approximately 120 degrees. This arrangement permits balancing of an enhanced quality because the pins having a small cross-sectional area complement that pin having the large cross-sectional area. This arrangement furthermore has the advantage of a small size of the opening or of the region which includes the openings for all the pins. This compact arrangement only slightly reduces the stability of the component. This is of decisive importance in particular for a rotor of an electric machine because in this case the openings can be arranged between the recesses for the windings or the permanent magnets.

In a further advantageous form of embodiment the pins have different sizes, different cross-sectional shapes and different cross-sectional areas and/or are in each case produced from materials having different densities, in particular from aluminum, steel, zinc, tungsten, lead, resin or plastic. The various materials are characterized by different weights and strength properties at the same size. When using pins made of steel, a high-strength friction-locked connection can be produced between the pin and the component. This holds true in particular if as a result of a directly contiguous arrangement of openings said openings coincide and a composite opening having a partially concave and partially convex edge is produced. The use of soft materials such as aluminum, copper, plastics or lead yields a good positive fit between the pin and the corresponding opening. In addition, irregularities in the inner surfaces of those openings which have a low surface quality due to manufacturing tolerances can be compensated for by the use of soft materials by means of the positive fit and leaks which may occur can be avoided. When plastics or a resin are used the possibility exists of introducing said materials into the corresponding opening in liquid form and subsequently hardening said materials and thereby forming a solid connection with the component.

In a further advantageous form of embodiment the pins are assembled from multiple elements having the same cross-sectional area which are fixed in the corresponding opening. A mixture of pins from a plurality of elements increases the achievable accuracy, in particular because a plurality of elements of different heights and densities can be combined. It is thereby possible to customize the pins to the existing imbalance. At the same time it is possible during balancing to reduce the number of openings in which the pins are fixed because a more precise customization to the required mass distribution can often already be, achieved with one pin, or two assembled from different elements. By means of this embodiment of the method, in similar fashion to a modular principle, a multiplicity of pins having different properties can be constructed from a few different elements. Yet more precise balancing can be achieved than if only one pin with a fixed length and a single material is employed because pins corresponding more precisely to the requirements can be combined. In particular for the pins having a small diameter, a customized combination of pins improves the quality of balancing.

In a further advantageous form of embodiment, after an imbalance has been determined the pins are introduced in automated fashion into the openings provided for the purpose. In the event of an inadequate quality of balancing the balancing operation is repeated. Automation of the balancing represents a significant advance in the series manufacturing of components, in particular involving large quantities. Even the capability for multistage balancing is possible through this method without the use of trained personnel and therefore offers a high cost advantage in the manufacturing process compared with manual balancing. Automation furthermore means that a consistently high quality of balancing is ensured which can only be achieved with difficulty by means of manual balancing.

In a further advantageous form of embodiment cylindrically shaped pins and/or angularly shaped pins and/or pins having a combination of different shapes of cross-sectional area are used as the pins which are fixed in the corresponding openings for balancing. Cylindrically shaped pins are regularly used for balancing components.

The use of pins having further cross-sectional shapes is also advantageous. A departure from the round cross-sectional area can for example produce a greater stability for the component. The increased stability resulting from an angular shape, for example, is due for example to a greater stability of shape. This holds true in particular in the situation if openings are not completely filled by the corresponding pins. It is moreover conceivable here to position cylindrically shaped pins in triangular or square openings in order to reduce weight.

BRIEF DESCRIPTION OF THE DRAWING

The invention will be described and explained in detail in the following with reference to the exemplary embodiments illustrated in the figures. In the drawings.

DETAILED DESCRIPTION OF PREFERRED EMBODIMENTS

Figure 1:
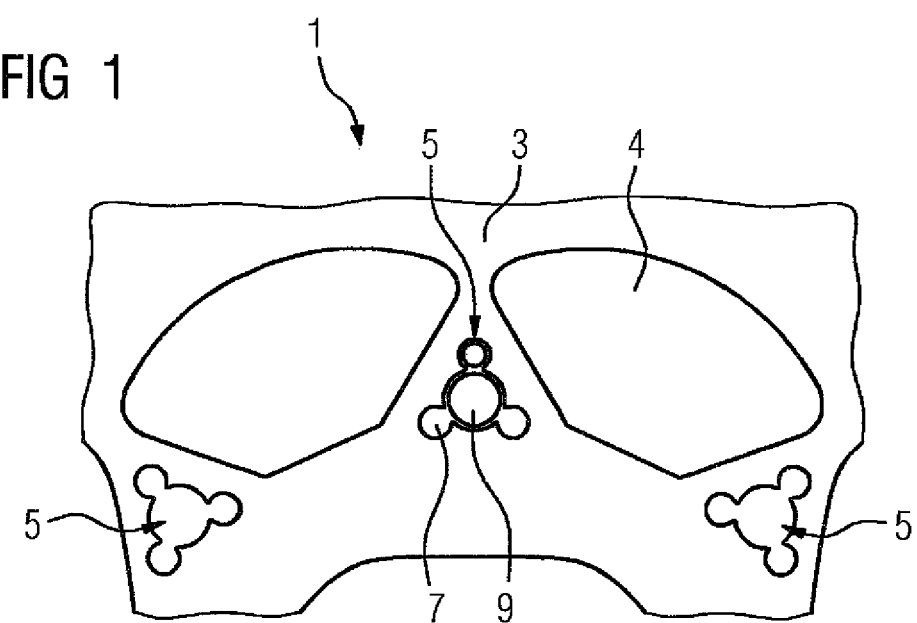
FIG. 1 shows a top view of a section of a component.

FIG. 1 shows a top view of a section of a component 1. The component 1 in question is a section of a lamination stack 3 of a rotor of an electric machine. The lamination stack has recesses 4, for example for weight reduction purposes, and also openings 5, 7, 9. The openings 5 are composed, as also illustrated again in FIG. 2, of circular openings 7, 9. The circular openings 7, 9 serve to accept the corresponding cylindrically shaped pins 11, 11'. The arrangement shown, in which an opening 5 for accepting cylindrically shaped pins 11, 11' is situated between each two recesses 4, proves to be particularly space-saving. The arrangement shown thereby contributes to a reduction in the weight, the modulus of inertia and the space requirement of the lamination stack 3. In order to balance the component, said component is set in rotation and the moments of deviation occurring as a result are measured. The weights of the pins 11, 11' are subsequently calculated for the individual openings 7, 9 and the corresponding pins 11, 11' are fixed in the openings 7, 9 provided.

Figure 2:
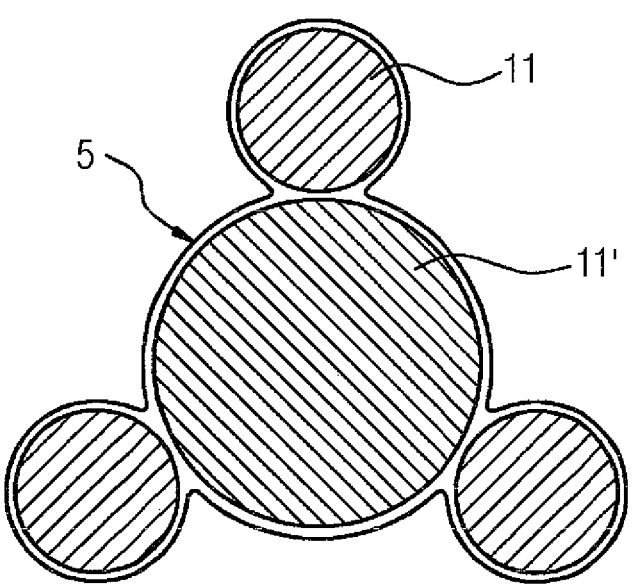
FIG. 2 shows an advantageous shape of the opening for accepting pins of different sizes.

FIG. 2 shows a section through the opening 5 which is composed of the circular opening 9 for the cylindrically shaped pins having a large cross-sectional area 11' and three circular openings 7 for the cylindrically shaped pins having a small cross-sectional area 11. Cylindrically shaped pins 11, 11' are already fixed in said circular openings 7, 9. One pin having a large cross-sectional area 11' is arranged centrally and around this are arranged three pins having a small cross-sectional area 11. In this situation the pins 11, 11' can either touch one another or, as illustrated here, be situated at a small spacing a from one another. Not too large a spacing a should be chosen since otherwise the opening 5 would occupy too much space in the component 1. The edge of the opening 5 encompasses all four cylindrically shaped pins 11, 11' in this case. In each case in the region between two cylindrically shaped pins 11, 11' the edge of the opening 5 encompasses the respective cylindrically shaped pins 11, 11' in a concave section. This concave region of the opening 5 provides an improved fit for the cylindrically shaped pins having a small cross-sectional area 7. Although the spacing a should be chosen as small as possible—it is however necessary to consider that an adequate stability of shape of the opening 5 is ensured. This holds true in particular if cylindrically shaped pins 11, 11' are not fixed in all the circular openings 7, 9.

Figure 3:
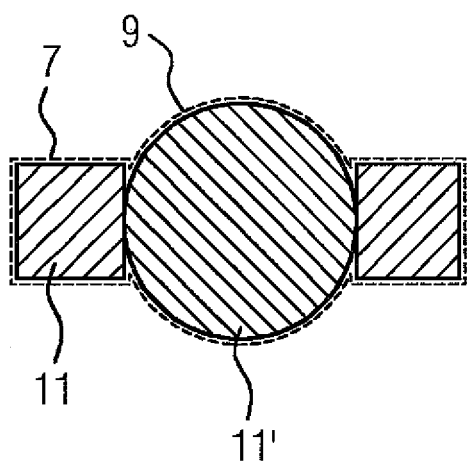
FIG. 3 shows a further advantageous shape of the opening for accepting pins of different sizes.

FIG. 3 shows a further advantageous shape of the opening 5. A shows a circular opening 9 for a cylindrically shaped pin having a large cross-sectional area 11'. Situated adjacent thereto are two square openings 7, in each of which is fixed a pin having a small cross-sectional area. If only the pins 11, 11' having a square cross-sectional area are fixed in the corresponding opening 7, 9 in this concrete embodiment, then it is advisable to choose an adhesive connection or a friction-locked connection for fixing the pins.

Figure 4:
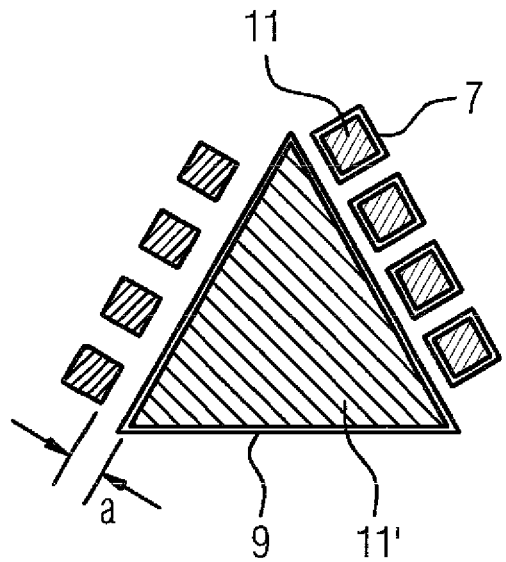
FIG. 4 shows a further advantageous shape of the opening for accepting pins of different sizes.

FIG. 4 shows a further advantageous shape of the opening 5, wherein the centrally arranged opening 9 is intended for a triangular pin having a large cross-sectional area 11 and square openings 7 for pins having a small cross-sectional area 11 are arranged along two sides at a distance a. In this case the openings 7, 9 are not contiguous. This gives an increased stability and independence of the individual pins 11, 11' with regard to their fixing. The disadvantage however is the increased space requirement if a greater distance a is chosen. An adhesive connection is again expedient for fixing the pins 11, 11' in the corresponding openings 7, 9.

Figure 5:
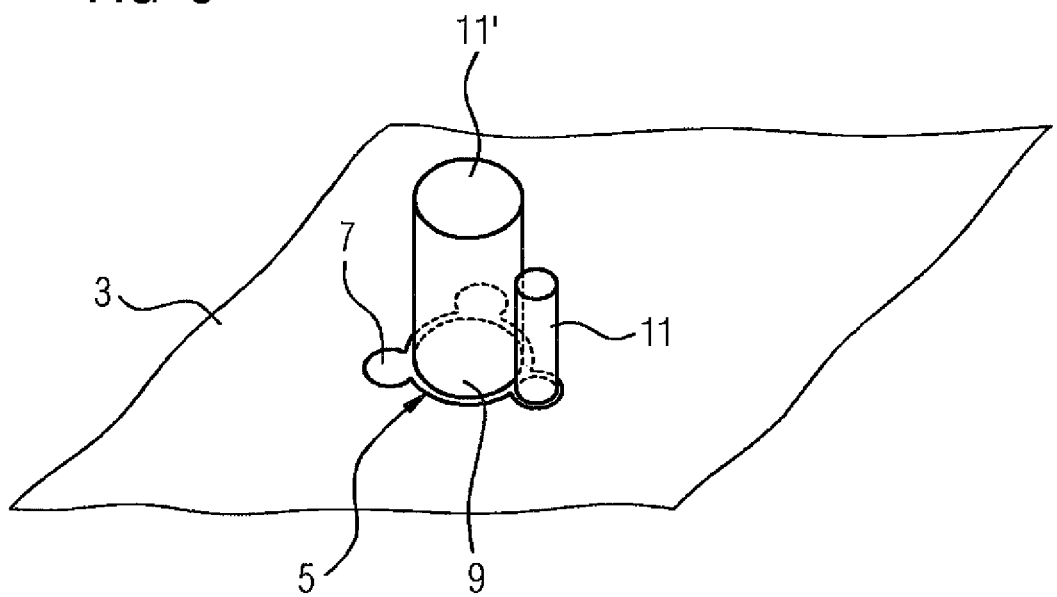
FIG. 5 shows a perspective view of cylindrically shaped pins prior to being fixed in corresponding openings.

FIG. 5 shows a perspective view of two cylindrically shaped pins 11, 11' prior to being fixed in the corresponding opening 7, 9. It can be seen that the pins 11, 11' have different lengths. Furthermore, not every one of the circular openings 7, 9 is provided with a corresponding pin 11, 11'. This is advantageous in particular in the case of a multistage method for balancing the component because additional cylindrically shaped pins 11, 11' can be fixed in the free openings 5, 7. After the pins 11, 11' have been inserted in the corresponding openings 7, 9 they can be fixed in the corresponding circular opening 7, 9 by means of a screw connection, by an adhesive connection or by a friction-locked connection.

Figure 6:
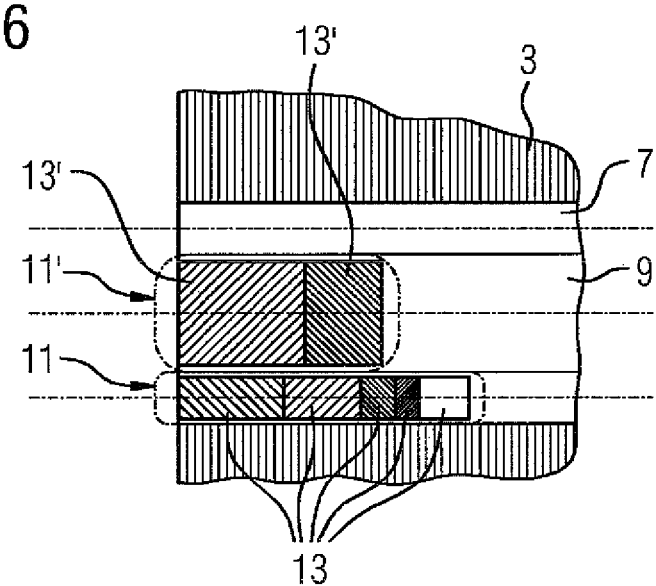
FIG. 6 shows a cross-section of a component after balancing.

FIG. 6 shows a cross-section through the component 1. The projection of three openings 7, 9 is visible in this case. The opening 9 having a large cross-sectional area is situated in the center and at each side thereof is arranged an opening having a small cross-sectional area 7. In the opening having a large cross-sectional area 9 are situated two elements having a small cross-sectional area 13', which together form the pin 11'. In the opening having a small cross-sectional area 7, drawn beneath said opening having a large cross-sectional area 9, are situated five elements having a small cross-sectional area 13, which together form the pin having a small cross-sectional area 11. The differing hatching of the respective elements 13, 13' indicates the use of different materials. In this situation the use of elements 13, 13' consisting of different materials having different densities can decisively improve the quality of the balancing. No pin 11 or element 13 has yet been fixed in the opening having a small cross-sectional area 7 situated above the opening having a large cross-sectional area 9. The individual elements 13, 13' can here again preferably be fixed in the corresponding opening 7, 9 by means of an adhesive connection. Although a connection by adhesive means has proved to be particularly advantageous, it is subsequently difficult to release. Therefore, in particular in the case of a multistage balancing method, additional openings 7, 9 for possible additional elements 13, 13' or pins 11, 11' are of decisive importance. Further openings having a small cross-sectional area 7 which are possibly present, which are shown for example in FIG. 2, are hidden by the other openings (here 9) in this figure and are not included in the drawing so as to give a better overview.

To summarize, the invention relates to a method for balancing a component 1, in particular a rotor of an electric machine, by means of pins 11, 11' which are introduced into prefabricated openings 5, 7, 9 in the component 1, wherein the component 1 is balanced in that pins 11, 11' of different lengths, cross-sectional areas and cross-sectional shapes are fixed in corresponding openings 7, 9 in the component 1. Furthermore, the pins 11, 11' can be assembled from multiple elements 13, 13' and the method can be used to increase the quality of balancing incrementally in one or more stages. The imbalance of the component 1 can be considerably reduced by using said method—and simultaneously the weight, space requirements and inertia of the component 1 can be reduced. In addition, the method can be automated.

The invention claimed is:

1. A method for balancing a component, comprising fixing pins having cross-sectional areas of different sizes in prefabricated corresponding openings of the component, wherein one of the openings is circular and has a first cross-sectional area, further comprising arranging the openings such that three further ones of the openings being circular in configuration and having a second cross-sectional area are arranged with their edges in immediate vicinity of an edge of the opening of first cross-sectional area, with the second cross-sectional area of the three further ones of the openings being smaller than the first cross-sectional area.

2. The method of claim 1, wherein the component is a rotor of an electric machine.

3. The method of claim 1, wherein one of the openings is circular and has a first cross-sectional area, further comprising arranging the openings such that a further one of the openings having a second cross-sectional area is arranged in the vicinity of the circular opening, with the second cross-sectional area being smaller than the first cross-sectional area.

4. The method of claim 1, wherein the pins of different sizes have different cross-sectional shapes and different cross-sectional areas and/or are produced from materials having different densities.

5. The method of claim 1, wherein the pins are made from aluminum, steel, zinc, tungsten, lead, resin or plastic.

6. The method of claim 1, further comprising assembling each of the pins from multiple elements for subsequent fixing in a corresponding one of the openings.

7. The method of claim 1, wherein the pins, after determination of an imbalance, are introduced automatically into the openings, and further comprising repeating a balancing operation, when a quality of balancing is inadequate.

8. The method of claim 1, wherein the pins have a shape which is cylindrical or angular and/or have cross-sectional areas formed from a combination of cross-sectional areas having different shapes.

9. A component of an electric machine comprising pins having cross-sectional areas of different sizes, said component having openings defined by cross-sectional areas of different sizes to complement the cross-sectional areas of the pins, said pins being fixed in the openings for balancing the component, wherein one of the openings is circular and has a first cross-sectional area, and three further ones of the openings are circular in configuration and have a second cross-sectional area, said further openings being arranged with their edges in immediate vicinity of an edge of the opening of first cross-sectional area, with the second cross-sectional area of the three further ones of the openings being smaller than the first cross-sectional area.

10. The component of claim 9, wherein one of the openings is circular and has a first cross-sectional area, and a further one of the openings has a second cross-sectional area which is arranged in the vicinity of the circular opening, with the second cross-sectional area being smaller than the first cross-sectional area.

11. The component of claim 9, wherein the pins of different sizes have different cross-sectional shapes and different cross-sectional areas and/or are produced from materials having different densities.

12. The component of claim 9, wherein the pins are made from aluminum, steel, zinc, tungsten, lead, resin or plastic.

13. The component of claim 9, wherein each of the pins is assembled from multiple elements for subsequent fixing in a corresponding one of the openings.

14. The component of claim 9, wherein the pins, after determination of an imbalance, are introduced automatically into the openings.

15. The component of claim 9, wherein the pins have a shape which is cylindrical or angular and/or have cross-sectional areas formed from a combination of cross-sectional areas having different shapes.

16. An electrically rotating machine, comprising a component which includes pins having cross-sectional areas of different sizes, said component having openings defined by cross-sectional areas of different sizes to complement the cross-sectional areas of the pins, said pins being fixed in the openings for balancing the component, wherein one of the openings is circular and has a first cross-sectional area, and three further ones of the openings are circular in configuration and have a second cross-sectional area, said further openings being arranged with their edges in immediate vicinity of an edge of the opening of first cross-sectional area, with the second cross-sectional area of the three further ones of the openings being smaller than the first cross-sectional area.

* * * * *